US011905177B2

(12) United States Patent
Paven et al.

(10) Patent No.: US 11,905,177 B2
(45) Date of Patent: Feb. 20, 2024

(54) STORAGE MEDIUM AND METHOD FOR SEPARATING, STORING AND TRANSPORTING CHLORINE FROM CHLORINE-CONTAINING GASES

(71) Applicant: COVESTRO INTELLECTUAL PROPERTY GMBH & CO. KG, Leverkusen (DE)

(72) Inventors: Maxime Paven, Langenfeld (DE); Yuliya Schiesser, Troisdorf (DE); Rainer Weber, Odenthal (DE); Gerhard Langstein, Kürten (DE); Vinh Trieu, Cologne (DE); Sebastian Hasenstab-Riedel, Kleinmachnow (DE); Nico Schwarze, Bielefeld (DE); Simon Steinhauer, Berlin (DE)

(73) Assignee: COVESTRO INTELLECTUAL PROPERTY GMBH & CO. KG, Leverkusen (DE)

( * ) Notice: Subject to any disclaimer, the term of this patent is extended or adjusted under 35 U.S.C. 154(b) by 653 days.

(21) Appl. No.: 17/054,149

(22) PCT Filed: May 3, 2019

(86) PCT No.: PCT/EP2019/061392
§ 371 (c)(1),
(2) Date: Nov. 9, 2020

(87) PCT Pub. No.: WO2019/215037
PCT Pub. Date: Nov. 14, 2019

(65) Prior Publication Data
US 2021/0087057 A1   Mar. 25, 2021

(30) Foreign Application Priority Data

May 7, 2018 (EP) ................................. 18170956.9
Dec. 18, 2018 (EP) ................................. 18213282.9

(51) Int. Cl.
*B01D 53/22* (2006.01)
*C01B 7/07* (2006.01)
*B01D 53/14* (2006.01)

(52) U.S. Cl.
CPC ........ *C01B 7/0743* (2013.01); *B01D 53/1493* (2013.01); *B01D 2252/2053* (2013.01); *B01D 2252/30* (2013.01); *B01D 2257/2025* (2013.01)

(58) Field of Classification Search
CPC ........ B01D 2252/30; B01D 2252/2053; B01D 53/1493; B01D 2257/2025; C01B 7/0743
See application file for complete search history.

(56) References Cited

U.S. PATENT DOCUMENTS

| | | | | |
|---|---|---|---|---|
| 2,097,264 A | * | 10/1937 | Tattersall | C07C 69/63 560/226 |
| 2,121,330 A | * | 6/1938 | Otto | C07C 17/14 570/127 |
| 2,558,319 A | * | 6/1951 | Sonia | C07C 45/30 570/192 |
| 3,812,081 A | | 5/1974 | Dennis et al. | |
| 4,331,676 A | * | 5/1982 | Gosteli | C07D 499/88 514/195 |
| 4,500,457 A | * | 2/1985 | Gosteli | C07D 499/88 540/310 |
| 4,692,442 A | * | 9/1987 | Gosteli | C07D 205/09 514/195 |
| 4,981,573 A | * | 1/1991 | Klotz | C25B 1/22 205/483 |
| 5,376,164 A | | 12/1994 | Zarchy et al. | |
| 2006/0226072 A1 | | 10/2006 | Wyse et al. | |
| 2006/0226074 A1 | * | 10/2006 | Wyse | F17C 11/00 239/10 |
| 2007/0221879 A1 | | 9/2007 | Hulse et al. | |
| 2008/0210633 A1 | * | 9/2008 | Wyse | G06Q 99/00 210/660 |
| 2008/0211118 A1 | * | 9/2008 | Wyse | B01D 11/0288 261/75 |
| 2015/0375429 A1 | * | 12/2015 | Butt | C08F 2/46 427/457 |
| 2016/0045875 A1 | * | 2/2016 | Butt | A61M 1/32 95/47 |
| 2018/0104644 A1 | * | 4/2018 | Cox, Jr. | B01D 53/52 |

FOREIGN PATENT DOCUMENTS

| | | |
|---|---|---|
| EP | 0741108 A2 | 11/1996 |
| WO | WO-2007109611 A1 | 9/2007 |
| WO | WO-2012130803 A1 | 10/2012 |

OTHER PUBLICATIONS

Los Alamos National Laboratory, "Periodic Table of Elements," 1 pages, retrieved Aug. 7, 2015, http://periodic.lanl.gov/index.shtml (Year: 2015).*
International Search Report for PCT/EP2019/061392 dated Jul. 15, 2019.
Written Opinion of the International Searching Authority for PCT/EP2019/061392 dated Jul. 15, 2019.
Robin Bruckner et al. "A 2D Polychloride Network Held Together by Halogen-Halogen Interactions" Angewandte Chemie, International Edition vol. 54, No. 51, Nov. 6, 2015 (Nov. 6, 2015), pp. 15579-15583.
Robin K Bruckner. "Investigation of polychloride anions stabilized by quaternary ammonium and other n-based cations" Oct. 4, 2016 (Oct. 4, 2016).

* cited by examiner

*Primary Examiner* — Anthony R Shumate
(74) *Attorney, Agent, or Firm* — K&L Gates LLP

(57) ABSTRACT

The invention relates to a storage medium and to a method for using a storage medium based on ionic compounds, which can reversibly absorb and store chlorine and chlorine from process gases, and which can release the same again by changing the ambient conditions, wherein the storage medium can be reused for this task after discharge.

13 Claims, No Drawings

STORAGE MEDIUM AND METHOD FOR SEPARATING, STORING AND TRANSPORTING CHLORINE FROM CHLORINE-CONTAINING GASES

CROSS-REFERENCE TO RELATED APPLICATIONS

This application is a national stage application (under 35 U.S.C. § 371) of PCT/EP2019/061392, filed May 3, 2019, which claims benefit of European Application Nos. 18170956.9, filed May 7, 2018, and 18213282.9, filed Dec. 18, 2018, all of which are incorporated herein by reference in their entirety.

The invention relates to a process for using a storage medium based on ionic compounds that can absorb and store chlorine and chlorine from process gases and release them again through alteration of the ambient conditions, the storage medium being reusable for this purpose after unloading. The advantages of this invention are that the absorption of chlorine by the storage media takes place under mild conditions, that the stores are liquid both in the loaded and unloaded state, and that, under ambient conditions, the chlorine has a substantially reduced vapor pressure compared with elemental chlorine, which increases safety in its storage and transport.

There are various process steps in the industrial production and use of chlorine in which optimization is possible. These include chlorine liquefaction for purifying the chlorine, the recovery of chlorine from chlorine-containing process gases, and liquefaction for the purpose of storage and transport of chlorine.

Thus, in chlorine production, liquefaction of chlorine is used to remove other gases present as impurities alongside chlorine. These impurities include gases such as oxygen, nitrogen or carbon dioxide that have lower boiling points than chlorine and can therefore be removed by liquefying the chlorine. In chlorine liquefaction, the large energy input necessary for cooling the chlorine and associated energy costs are a major disadvantage.

For industrial use, chlorine is stored in liquid form and transported to the respective point of use, with transport effected via pipelines or else above ground by road or rail. The chlorine is here generally in liquid form at room temperature under an increased pressure of e.g. 7 bar. As an alternative to this, chlorine can be used at low pressures, but this necessitates storage at very low temperatures in the region of −35° C. The transport of chlorine in liquid form at substantially lower pressures, preferably 1000 hPa, and mild temperatures, preferably 25° C., would be advantageous.

Chlorine production and other chemical production processes involving the use of chlorine generate various process gases that contain residual amounts of chlorine. Residual chlorine is removed from industrial process gases by chemical reaction, for example with sodium hydroxide solution, which results in the formation of sodium hypochlorite. Although it is possible for some of the chlorine to be released again through addition of hydrochloric acid, this process consumes hydrochloric acid and results in the formation of sodium chloride as a by-product. What would be advantageous is a process that removes all the chlorine from process gases with high efficiency and allows the stored chlorine to be completely recycled.

The above-described processes for the purification, storage, and transport through liquefaction or gas scrubbing are common in the prior art and in industrial use.

The challenges to be addressed are to provide a reversible storage medium for chlorine that absorbs and stores large amounts of chlorine under mild conditions, preferably at temperatures of 25° C. and ambient pressure (typically 1000±100 hPa), and releases said chlorine again as required, in order to avoid the need for energy-intensive liquefaction at low temperatures and/or high pressures. This storage medium should, in particular, be liquid within the working range, that is to say between the loaded and unloaded state, in order that the storage medium can be pumped and transported to the point of use with the aid of customary pumps.

A further object to be achieved is to provide a storage medium having the above properties that allows chlorine to be isolated and recovered from gas mixtures in a simple manner, the storage medium being reusable once it has been unloaded.

A further object to be achieved is to provide a storage medium that binds chlorine under the above conditions and thus substantially reduces the vapor pressure of the chlorine compared to unbound chlorine. An advantage of such a storage medium is that, in the event of a leak from the storage container, the bound chlorine escapes into the environment substantially more slowly than elemental chlorine, which affords more time in which to take the appropriate protective and repair measures.

Storage media based on chlorine adsorption on porous solids by the process of pressure swing adsorption (PSA) are described in the prior art. As adsorbents for chlorine, EP0741108A2 proposes zeolites, non-zeolitic porous acid oxides, activated carbon and molecular sieve carbons. U.S. Pat. No. 5,376,164A1 describes as adsorbents molecular sieves including zeolitic sieves, activated carbon, activated clay, silica gel, and activated aluminum oxide. The chlorine adsorption measurements on various zeolites and silica gel described in U.S. Pat. No. 5,376,164A1 show a maximum loading of <0.2 g of chlorine per g of storage material under the respective measurement conditions (room temperature, maximum 0.87 bar), which is very low and too costly for industrial use. Moreover, the storage media are solids, which limits in particular the flexibility in the filling and transport of the stored chlorine.

The invention is based on the observation described in the prior art that certain ionic compounds consisting of organic cations and chloride as anion have an affinity for chlorine and for chlorine-containing gases and are able to absorb chlorine with the formation of polychlorides ($Cl_x^-$ where x>1) (F. D. Chattaway, G. Hoyle, *J. Chem. Soc., Trans.* 1923, 123, 654; R. Brickner, H. Haller, S. Steinhauer, C. Miller, S. Riedel, *Angew. Chem. Int. Ed* 2015, 54, 51, 15579-15583).

For example, U.S. Pat. No. 7,638,058 BB claims a process for storing and purifying an unstable fluid using an ionic liquid within a container and providing this container to a customer. The fluid is released by increasing the temperature, lowering the ambient pressure or by purging with an inert gas. The unstable fluids are preferably compounds from the group digermane, borane, diborane, disilane, fluorine, halogenated carbon-hydrogen-oxygen compounds, hydrogen selenide, stibine, nitric oxide, organometallic compounds, and mixtures thereof. For storage, the fluid is contacted with an ionic liquid. For purifying the fluid of water, $CO_2$, $O_2$, CO, NO, $NO_2$, $N_2O_4$, $SO_2$, $SO_3$, SO, $S_2O_2$, and $SO_4$, the addition of metal oxides, thermally activated aluminum, carbon materials or molecular sieves is in some cases preferable. In addition to a large number of ionic liquids having different anions, imidazolium and pyridinium cations or tributylhexadecylphosphonium as cation are mentioned as representatives of ionic liquids having chloride as anion.

WO2007109611A1 describes a process for the safe storage and transport of chlorine at ambient pressure. 1-Methyl-3-ethylimidazolium chloride and pyridine hydrochloride are preferred. Tetraalkylammonium and phosphonium chlorides are also mentioned.

WO12130803A1 describes a process for removing halogens from mixtures of substances (CO, $CO_2$, $N_2$, methyl isocyanate, and methyl bromide). The contacting of the ionic liquid with chlorine or chlorine-containing gas takes place in a rectification column in a temperature range from $\geq 50°$ C. to $\leq 200°$ C. and pressures from $\geq 0.1$ bar to $\leq 30$ bar. The chlorine-containing ionic liquid is then fed into a separation device. There, the chlorine is (partially) released at elevated temperature and/or reduced pressure. The following compound classes are proposed: imidazolium, pyridinium, pyrrolidinium, guanidinium, phosphonium, and ammonium chlorides. Preferred compounds are trihexyltetradecylphosphonium chloride, 1-benzyl-3-methylimidazolium chloride, and 1-methyl-3-octylimidazolium chloride. Tetrabutylammonium chloride is described as an additive to improve fluidity.

It is generally known that ionic compounds that are in the form of solids can liquefy through the introduction of chlorine. However, the industrial implementation of a reversible, liquid storage medium based on the ionic compound trihexyltetradecylphosphonium trichloride, as proposed in WO12130803A, has proven disadvantageous, since the compound mentioned is very viscous in the loaded state ($\eta > 407$ mPa·s at $25°$ C., X. Li, A. Van den Bossche, T. Vander Hoogerstraete, K. Binnemans, *Chemical Communications* 2018, 54, 5, 475-478). The same applies to possible storage media based on tetrabutylammonium chloride (see example 1) and other compounds mentioned in the prior art.

A further challenge is that the storage media need to be both chemically and structurally stable toward corrosive chlorine. Firstly, chlorination of the organic cation results in the release of hydrochloric acid, which can adversely affect equipment components on account of its corrosiveness. Secondly, chlorination of the cation results in an increase in the molecular weight of the ionic compound, which results in a reduction in relative loadings (g chlorine/g ionic compound), making the storage medium less economically viable. Thus, imidazolium-based cations, as proposed in U.S. Pat. No. 7,638,058 B, WO2007109611A1, and WO12130803A1, are ultimately unsuitable, because the aromatic ring and side chains having chain lengths of 4 or more carbon atoms undergo chlorination (X. Li, A. Van den Bossche, T. Vander Hoogerstraete, K. Binnemans, *Chemical Communications* 2018, 54, 5, 475-478). It follows that other aromatic ionic compounds, such as pyridinium-based ionic compounds, and alkylammonium or alkylphosphonium chlorides having chain lengths of 4 or more carbon atoms, such as trihexyltetradecylphosphonium trichloride, are not favored on account of their tendency to undergo chlorination.

Surprisingly, it was found that the technical challenges mentioned above are addressed by storage media based on ionic compounds of the general formula $N-R1_m R2_n R3_o^+ Cl_r^-$ and $P-R4_p R5_q^+ Cl_s^-$, which can be used as reversible chlorine stores and for removing chlorine from chlorine-containing process gases. They can be used for this purpose individually or in specific mixing ratios. The radicals R1, R2, R3, R4, and R5 are independently identical or different alkyl radicals selected from the following group: methyl, ethyl, n-propyl, isopropyl, n-butyl, isobutyl, and 2-methylpropyl, preferably methyl, ethyl or n-propyl, but with the restriction that at least one radical R1, R2 or R3 is different from the respective other radicals R1, R2, and R3 and that the radicals R4 and R5 are different from one another, where the characters m, n, o, p, and q are independently an integer in the series from 0 to 3 and where the sum m+n+o and the sum p+q must result in a value of 4.

The compounds accordingly have short alkyl chains and are not aromatic, so as to prevent chlorination of the ionic compound. The invention is based on ionic compounds of the formula $N-R1_m R2_n R3_o^+ Cl_r^-$ and $P-R4_p R5_q^+ Cl_s^-$, where r and s=1. The corresponding ionic compounds are solids at $25°$ C. and 1000 hPa and form the basis of the novel chlorine store.

In order to obtain reversible chlorine stores that are liquid in both the chlorine-loaded and unloaded state, the above solids are in an initial loading contacted with chlorine and conditioned for use. This results in the formation, for example, initially of chlorine storage compounds of the formula $N-R1_m R2_n R3_o^+ Cl_r^-$ and $P-R4_p R5_q^+ Cl_s^-$, where r and s are independently an odd number from 1 to 7 and preferably r and s are 1 or 3, leading to the liquefaction of the storage medium. When further chlorine is added, loaded chlorine storage compounds of the formula $N-R1_m R2_n R3_o^+ Cl_{(r+2)}^-$ and $P-R4_p R5_q^+ Cl_{(s+2)}^-$ are obtained, where the characters r and s are independently an odd number from 1 to 7 and preferably r and s are independently 1 or 3.

The storage medium is considered to be loaded when no further chlorine is absorbed by the storage medium under the prevailing absorption conditions (selected temperature and selected pressure). The storage medium is unloaded by altering the ambient conditions (increasing the temperature, reducing the partial pressure) or by passing a foreign gas through it. The storage medium is considered to be unloaded when no further chlorine is released from the storage medium under the chosen ambient conditions (selected temperature and selected pressure). The difference between the loaded and unloaded state of the storage medium corresponds to the amount of chlorine that is released and thus usable. For industrial implementation, high chlorine release is important and that the store is sufficiently liquid under the chosen conditions (temperature and pressure) for it to be processed by means of pumps and other conveyor systems. Reconciling these requirements represents a major challenge that has not been adequately addressed in the prior art.

The invention consequently provides a storage medium for the reversible absorption of chlorine from chlorine-containing gas—also referred to in abbreviated form hereinabove and hereinbelow as "chlorine store"—comprising at least one ionic compound of the general formula (I) and/or (II),

$$N-R1_m R2_n R3_o^+ Cl_r^- \quad (I)$$

$$P-R4_p R5_q^+ Cl_s^- \quad (II)$$

preferably ionic compounds of the general formula (I), in which the radicals R1, R2, R3, R4, and R5 are independently identical or different alkyl radicals selected from the following group: methyl, ethyl, n-propyl, isopropyl, n-butyl, isobutyl, and 2-methylpropyl, preferably methyl, ethyl or n-propyl, but with the restriction that at least one radical R1, R2 or R3 is different from the respective other radicals R1, R2, and R3 and that the radicals R4 and R5 are different from one another, where the characters m, n, o, p, and q are independently an integer in the series from 0 to 3 and where the sum m+n+o and the sum p+q must result in a value of 4,
the characters r and s are independently an odd number from 1 to 7 and preferably r and s are 1 or 3,
and where the storage medium is liquid within the working range of loading with chlorine and unloading of chlorine, in particular at a temperature of 25° C. and a pressure of 1000±100 hPa.

When the storage medium is based on an ionic compound of the general formula (I) and/or (II), for example where indices r and s=1, that are solid under the abovementioned physical conditions, it is necessary in a preferred embodiment for the storage medium to comprise at least one further compound, in particular one of the general formula (I) and/or (II), that is liquid under these conditions or that makes the mixture liquid (e.g. eutectic).

Particular preference is given to a storage medium in which the ionic compound (I) or (II) is selected from at least one compound of the following series: $NEtMe_3Cl_r$, $NEt_2Me_2Cl_r$, $NEt_3MeCl_r$, $NMePr_3Cl_r$, $PEt_3MeCl_s$, where r and s are independently an odd number from 1 to 7 and preferably r and s are independently 1 or 3.

In a preferred variant of the invention, the ionic compound (I) or (II) in the storage medium is selected from at least one compound of the following series: $NEtMe_3Cl_r$, $NEt_2Me_2Cl_r$, $NEt_3MeCl_r$, $NMePr_3Cl_r$, $PEt_3MeCl_r$, where r and s are independently an odd number from 1 to 7 and preferably r and s are independently 1 or 3.

Compound (I) is very particularly preferably selected from at least one compound of the following series: $NEtMe_3Cl_r$, $NEt_2Me_2Cl_r$, $NEt_3MeCl_r$, where r is an odd number from 1 to 7 and preferably r and s are independently 1 or 3.

Preference is therefore given to a novel storage medium in which the ionic compounds of the formula (I) and/or of the formula (II) contained therein are brought into contact with chlorine. Chlorine is absorbed here under mild conditions, preferably at temperatures in a range from ≥0° C. to ≤40° C., more preferably at a temperature of ≥15° C. to ≤30° C., and a pressure within a range from ≥900 hPa to ≤7000 hPa, preferably ≥900 hPa to ≤1100 hPa.

In particular, the chlorine is absorbed by the storage medium at ambient pressure (ambient atmospheric pressure, e.g. of 1 bar (1000 hPa) at sea level) and 20-25° C., the ionic compounds present in the storage medium reacting to form polychlorides of the formula (III) and/or of the formula (IV),

$$N{-}R1_mR2_nR3_o{}^+Cl_{(r+2)}{}^- \quad (III)$$

$$P{-}R4_pR5_q{}^+Cl_{(s+2)}{}^- \quad (IV)$$

preferably to ionic compounds of the general formula (III), where, in the formulas (III) and (IV), the radicals R1, R2, R3, R4, and R5 are independently identical or different alkyl radicals selected from the following group: methyl, ethyl, n-propyl, isopropyl, n-butyl, isobutyl, and 2-methylpropyl, preferably methyl, ethyl or n-propyl, and where the radicals R1, R2, and R3 and the radicals R4 and R5 are in each case different from one another,
where the characters m, n, o, p, and q are independently an integer in the series from 0 to 3 and where the sum m+n+o and the sum p+q must result in a value of 4,
the characters r and s are independently an odd number from 1 to 7 and preferably r and s are independently 1 or 3.

The chlorine stores according to the invention can absorb large amounts of chlorine and in the loaded state (in particular measured at 25° C. and 1000 hPa) contain in particular at least 0.65 g of $Cl_2$ per g of ionic compound, preferably at least 0.7 g of $Cl_2$ per g of ionic compound, more preferably 0.75 g of $Cl_2$ per g of ionic compound. With these loads, different proportions of different polychloride anions may be present side by side, for example $Cl_3{}^-$, $Cl_5{}^-$, $Cl_7{}^-$, and higher polychlorides.

The invention also relates to a process for the reversible storage of chlorine and of chlorine from chlorine-containing gas in a storage medium, characterized in that, in a first step, a novel process described above for removing and storing chlorine from chlorine-containing gas is executed and that, in a further process step, stored chlorine is removed from the loaded storage medium by increasing the temperature of the storage medium and/or lowering the partial pressure above the storage medium, with discharge of the chlorine obtained.

In accordance with the above remarks, the initial loading and thus the conditioning of the storage medium to obtain a liquid chlorine store of the formula $N{-}R1_mR2_nR3_o{}^+Cl_r{}^-$ and $P{-}R4_pR5_q{}^+Cl_s{}^-$, where r and s are ≥1 is carried out in a first step in particular once; this first step may be spatially and also temporally separated or upstream of the task of reversible chlorine storage. The conditioned chlorine store is fed into a device for reversible chlorine storage, in which it is contacted with the chlorine to be bound, resulting in a loaded chlorine store of the formula $N{-}R1_mR2_nR3_o{}^+Cl_{(r+2)}{}^-$ and $P{-}R4_pR5_q{}^+Cl_{(s+2)}{}^-$, where r and s are independently an odd number from 1 to 7 and preferably r and s are 1 or 3. Without being restricted to a particular equipment setup, the equipment unit used may be a safety vessel or pressure vessel or the like.

The loaded chlorine store can then be pumped, transported, and stored by means of pumps. When needed, the bound chlorine can be released again from the chlorine store by feeding the loaded chlorine store into a separation device. During unloading, the loaded chlorine store of the formula $N{-}R1_mR2_nR3_o{}^+Cl_{(r+2)}{}^-$ and $P{-}R4_pR5_q{}^+Cl_{(s+2)}{}^-$, where r and s are ≥1, is in particular converted back into an unloaded chlorine store of the formula $N{-}R1_mR2_nR3_o{}^+Cl_{(r)}{}^-$ and $P{-}R4_pR5_q{}^+Cl_{(s)}{}^-$, where r and s are ≥1, allowing the unloaded chlorine store to be reused.

The unloading of the chlorine store takes place through deliberate alteration of the ambient conditions (increasing the temperature and/or reducing the partial pressure). The chlorine store is here typically unloaded to such an extent that the unloaded chlorine store is still liquid and corresponds to the formula $N{-}R1_mR2_nR3_o{}^+Cl_{(r)}{}^-$ and $P{-}R4_pR5_q{}^+Cl_{(s)}{}^-$, where r and s are ≥1.

The unloading of the reversible storage medium takes place at a temperature within a range from ≥40° C. to ≤200° C., preferably ≥50° C. to ≤150° C., more preferably ≥60° C. to ≤100° C., and at 1000±100 hPa. Release can optionally be initiated by reducing the partial pressure, the reduction in partial pressure preferably being at least 100 hPa compared to the first step.

In a particularly preferred embodiment, the chlorine store is unloaded at 1000 hPa and a temperature of 60° C. In particular, at least 0.10 g of chlorine per g of ionic compound, preferably at least 0.20 g of chlorine per g of ionic compound, more preferably at least 0.30 g of chlorine per g of ionic compound, is released from the chlorine store during this process.

Preference is given to chlorine stores that in the unloaded state are liquid and have dynamic viscosities $\eta_{unloaded}$ of ≤400 mPa·s, more preferably ≤200 mPa·s (measured at 1000 hPa and 25° C.), thus allowing the unloaded chlorine stores to be processed by means of customary pumps.

The invention further provides a process for removing chlorine from chlorine-containing gas, characterized in that the gas is contacted with a liquid storage medium comprising ionic compounds of the formula (I) and/or of the formula (II), with the chlorine contained in the gas bound in the form of ionic compounds of the formula (III) and/or of the formula (IV).

$$N\text{---}R1_m R2_n R3_o{}^+ Cl_{(r+2)}{}^- \quad (III)$$

$$P\text{---}R4_p R5_q{}^+ Cl_{(s+2)}{}^- \quad (IV)$$

preferably ionic compounds of the general formula (III), where, in the formulas (III) and (IV), the radicals R1, R2, R3, R4, and R5 are independently identical or different alkyl radicals selected from the following group: methyl, ethyl, n-propyl, isopropyl, n-butyl, isobutyl, and 2-methylpropyl, preferably methyl, ethyl or n-propyl, but with the restriction that at least one radical R1, R2 or R3 is different from the respective other radicals R1, R2, and R3 and that the radicals R4 and R5 are different from one another,
where the characters m, n, o, p, and q are independently an integer in the series from 0 to 3 and where the sum m+n+o and the sum p+q must result in a value of 4,
the characters r and s are independently an odd number from 1 to 7 and preferably r and s are independently 1 or 3.

A further preferred process is characterized in that, in a first step as conditioning, the storage medium comprising compounds of the formula (I) and/or of the formula (II), in which in particular the indices r and s=1, becomes loaded with chlorine gas only to such an extent that the storage medium liquefies.

In a preferred variant of the novel process, the initial loading and thus conditioning with chlorine takes place to such an extent that a storage medium of the formula (I) and/or of the formula (II) is obtained, where r and s are independently an odd number from 1 to 7 and preferably r and s are independently 1 or 3, and where the storage medium is not fully loaded with chlorine.

In a particularly preferred embodiment of the novel process, chlorine is removed from chlorine-containing gas through contacting with the above not fully loaded storage medium, as a result of which the storage medium becomes loaded and the storage medium corresponding to formula (I) and/or formula (II) reacts to form ionic compounds of the formula (III) or (IV).

Preferably, the removal of chlorine from chlorine-containing gas takes place under mild temperatures, preferably at a temperature in a range from ≥0° C. to ≤40° C., more preferably at a temperature of ≥15° C. to ≤30° C., and a pressure within a range from ≥900 hPa to ≤7000 hPa, preferably ≥900 hPa to ≤1100 hPa.

In particular, the above liquid, reversible chlorine stores can be used to remove chlorine from chlorine-containing process gases, to purify the process gas of chlorine, and to make the chlorine subsequently available again for other uses. The separation task involves removing chlorine from process gases, especially those comprising $H_2$, $CO_2$, $O_2$, CO, NO, $NO_2$, $N_2O_4$, $SO_2$, $SO_3$, SO, $S_2O_2$, $SO_4$, and mixtures thereof. The chlorine is removed from the gas mixture by contacting the chlorine-containing process gas with a liquid, unloaded chlorine store of the formula (I) and/or of the formula (II) in accordance with the above remarks.

The contacting of the storage medium with chlorine-containing gas may in principle be carried out in a known gas-liquid absorption apparatus, e.g. in a packed column, tray column, etc.

Contacting results in the formation of a loaded chlorine store comprising compounds of the formula $N\text{---}R1_m R2_n R3_o{}^+ Cl_{(r+2)}{}^-$, and $P\text{---}R4_p R5_q{}^+ Cl_{(s+2)}{}^-$, where r and s are ≥1 and the radicals are otherwise as defined above in very general form, said chlorine store being drawn off in liquid form at the bottom of the column. The process gases to be removed, which do not contain chlorine, remain in the gas phase above the liquid chlorine store and can be removed.

Without being bound to a specific equipment setup, the liquid, loaded chlorine store can either be unloaded again in the same equipment by increasing the temperature and/or reducing the pressure or it may be transferred by means of pumps to a separate equipment unit for unloading. The unloading of the loaded chlorine store can in principle be carried out by analogy with the above remarks.

The invention further provides for the use of the novel storage medium in the storage of chlorine and in the removal of chlorine from chlorine-containing gases, in particular for filling storage containers for chlorine. Particularly suitable as storage containers are pressure tanks, gas cylinders, but also safety containers for corrosive liquids.

The novel storage medium preferably binds chlorine such that the vapor pressure of the chlorine store is lower than the vapor pressure of elemental chlorine under the same conditions. This results in increased safety when handling chlorine, especially during transport and storage. In the event of a release of such a chlorine store as a result of a leak, chlorine is released into the environment more slowly. This means there is more time available to take appropriate protective and emergency measures than would be the case after an escape of elemental gaseous chlorine.

EXAMPLES

In order to obtain reversible storage media, ionic compounds that are solid at room temperature and ambient pressure (e.g. corresponding to the above formula I, where r and s=1) should first be fed into an initial loading with chlorine in order to bring about liquefaction of the ionic compound and associated formation of polychlorides. The liquefied polychlorides containing ionic compounds serve thereafter as reversible storage media and are only partially unloaded through the chosen release parameters, with the result that the storage media are liquid both in the loaded and in the unloaded state. In the case of ionic compounds or liquid mixtures of different ionic compounds to be used in the chlorine storage medium that are themselves liquid at room temperature, there is no need for preloading with chlorine to achieve the liquid state.

Example 1 (Prior Art)

A reactor was charged with tetrabutylammonium chloride [NBu$_4$]Cl (100 g) and this was thermally equilibrated at 20° C. The initial loading of the ionic compound was effected by introducing chlorine at approx. 1000 hPa, which led to liquefaction of the [NBu$_4$]Cl. This resulted in the absorption by the [NBu$_4$]Cl of 61 g of chlorine, i.e. 0.61 g of chlorine per g of ionic compound. The loaded chlorine store was unloaded at 60° C., resulting in the release again of 23 g of chlorine, i.e. 0.23 g of chlorine per g of ionic compound. The dynamic viscosity of the unloaded chlorine store at 60° C. was 430 mPa·s. The chlorine loads in the loaded and unloaded states were determined at 20° C. and 1000 hPa. The dynamic viscosity of the store in the chlorine-loaded and unloaded states was measured at 25° C. and 1000 hPa using a micro-Ubbelohde viscometer (inner diameter 0.53 mm, SI-Analytics GmbH, Mainz).

The combination of high viscosity and low chlorine release of the loaded chlorine store and the more difficult handling of the initially solid storage material has proved disadvantageous for implementation of the laboratory process on an industrial scale.

Example 2 (According to the Invention)

In order to obtain liquid and reversible storage media, a reactor was in a first step charged with solid triethylmethylammonium chloride [NEt$_3$Me]Cl (100 g) and this was thermally equilibrated at 20° C. The initial loading of the ionic compound was effected by introducing chlorine at approx. 1000 hPa, as a result of which 87 g of chlorine was bound and the storage medium ([NEt$_3$Me]Cl) liquefied. This resulted in the absorption by the [NEt$_3$Me]Cl of 0.87 g of chlorine per g of ionic compound, the dynamic viscosity of the liquid, loaded chlorine store being 19 mPa·s. Raman spectroscopy showed the loaded chlorine store to consist of a mixture of different tri- to nonachlorides, corresponding formally to [NEt$_3$Me]Cl$_{4.7}$. The loaded store was unloaded at 60° C., resulting in the release of 30 g of chlorine, i.e. 0.30 g of chlorine per g of ionic compound. The dynamic viscosity of the unloaded chlorine store was 44 mPa·s.

Compared to chlorine stores based on [NBu$_4$]Cl, the viscosity of the chlorine store in the loaded and unloaded state is substantially lower, while chlorine release is higher.

The liquid chlorine store could be unloaded at 60° C. to be loaded afresh with chlorine, with absorption carried out under the above-mentioned conditions (introduction of chlorine at approx. 1000 hPa and thermal equilibration of the reactor at 20° C.). In the renewed loading, 87 g of chlorine, i.e. 0.87 g of chlorine per g of ionic compound, was again absorbed and, during subsequent unloading under the above conditions (60° C.), 30 g of chlorine, i.e. 0.30 g of chlorine per g of ionic compound, was again released, with the storage medium always remaining liquid in the loaded and unloaded state. The liquid chlorine store could be loaded and unloaded more than 4 times without a decrease in the amounts of chlorine stored and released being observed.

Example 3 (According to the Invention)

In order to obtain liquid and reversible storage media, a reactor was in a first step charged with solid diethyldimethylammonium chloride [NEt$_2$Me$_2$]Cl (100 g) and this was thermally equilibrated at 20° C. The initial loading of the ionic compound was effected by introducing chlorine at approx. 1000 hPa, as a result of which 82 g of chlorine was bound and the storage medium ([NEt$_2$Me$_2$]Cl) liquefied. This resulted in the absorption by the [NEt$_2$Me$_2$]Cl of 0.82 g of chlorine per g of ionic compound, the dynamic viscosity of the liquid, loaded chlorine store being 16 mPa·s. The loaded store corresponds formally to the composition [NEt$_2$Me$_2$]Cl$_{4.2}$. The loaded store was unloaded at 60° C., resulting in the release again of 29 g of chlorine, i.e. 0.29 g of chlorine per g of ionic compound. The dynamic viscosity of the unloaded chlorine store was 37 mPa·s.

Compared to chlorine stores based on [NBu$_4$]Cl, the dynamic viscosity of the chlorine store in the loaded and unloaded state is substantially lower, while chlorine release is higher.

In analogous manner to example 2, the loaded liquid chlorine store could be loaded afresh with chlorine, with absorption carried out under the above-mentioned conditions (introduction of chlorine at approx. 1000 hPa and thermal equilibration of the reactor at 20° C.). In the renewed loading, 82 g of chlorine, i.e. 0.82 g of chlorine per g of ionic compound, was absorbed and, during subsequent unloading under the above conditions, 29 g of chlorine, i.e. 0.29 g of chlorine per g of ionic compound, was again released, with the storage medium always remaining liquid in the loaded and unloaded state. The liquid chlorine store could be loaded and unloaded more than 4 times without a decrease in the amounts of chlorine stored and released being observed.

The invention claimed is:

1. A process for the reversible storage of chlorine from chlorine-containing gas in a storage medium, the process comprising:
   contacting chlorine-containing gas with a liquid storage medium in a first step to form a loaded storage medium, the liquid storage medium comprising an ionic compound (I) having the formula

   $$N\text{—}R1_mR2_nR3_o{}^+Cl_s{}^- \qquad (I);$$

wherein the loaded storage medium comprises chlorine from the chlorine-containing gas in an ionic compound (III) having the formula

   $$N\text{—}R1_mR2_nR3_o{}^+Cl_{(r+2)}{}^- \qquad (III);$$

wherein each of R1, R2 and R3 independently comprise an alkyl radical selected from the following group: methyl, ethyl, n-propyl, isopropyl, n-butyl, isobutyl, and 2-methylpropyl;
   wherein R1, R2, and R3 collectively comprise more than one type of alkyl radical:
   wherein m is an integer in a range of 0 to 3, n is an integer in a range of 0 to 3, o is an integer in a range of 0 to 3, and wherein a sum consisting of m, n, and o is 4; and
   wherein r is an odd number in a range of 1 to 7, and wherein s is an odd number in a range of 1 to 7;
   removing chlorine from the loaded storage medium by increasing a temperature of the storage medium and/or lowering a partial pressure above the storage medium, thereby discharging chlorine.

2. The process as claimed in claim 1, wherein removing the chlorine takes place at a temperature within a range of 40° C. to 200° C., and at a pressure within a range of 900 hPa to 1100 hPa.

3. The process as claimed in claim 1, wherein removing the chlorine is initiated through reducing the partial pressure by at least 100 hPa.

4. The process as claimed in claim 1, wherein at least 0.10 g of chlorine per g of ionic compound (III), is released from the storage medium during this process.

5. The process as claimed in claim 1, wherein m is an integer in a range of 1 to 3, n is an integer in a range of 1 to 3, and o is equal to 0.

6. The process as claimed in claim 1, wherein the ionic compound (I) comprises a compound selected from the group consisting of NEtMe$_3$Cl$_r$, NEt$_2$Me$_2$Cl$_r$, NEt$_3$MeCl$_r$, NBuEt$_2$MeCl$_r$, NMePr$_3$Cl$_r$, and NBu$_2$Me$_2$Cl$_r$.

7. The process as claimed in claim 1, wherein the ionic compound (I) comprises a compound selected from the group consisting of NEtMe$_3$Cl$_r$, NEt$_2$Me$_2$Cl$_r$, and NEt$_3$MeCl$_r$.

8. The process as claimed in claim 1, wherein the loaded storage medium contains at least 0.65 g of chlorine per g of ionic compound (III).

9. The process as claimed in claim 1, wherein the loaded storage medium is liquid at a temperature of 25° C. and a pressure of 1000±100 hPa.

10. The process as claimed in claim 1, wherein the process comprises conditioning an initial loading of a storage medium with chlorine gas, wherein the storage medium comprises the ionic compound (I), wherein the initial loading of the storage medium becomes loaded with chlorine gas only to such an extent that the storage medium liquefies.

11. The process as claimed in claim 10, wherein conditioning with chlorine takes place to such an extent that a storage medium of ionic compound (III) is obtained and the storage medium of ionic compound (III) is not fully loaded with chlorine.

12. The process as claimed in claim 10, wherein in a second step after conditioning, chlorine is removed from chlorine-containing gas through contacting with the liquid storage medium from the first step, as a result of which the storage medium becomes loaded and the compounds (I) reacts to form ionic compounds (III).

13. The process as claimed in claim 1, wherein the loading of the liquid storage medium takes place at a temperature in a range of 0° C. to 40° C. and a pressure within a range of 900 hPa to 7000 hPa.

\* \* \* \* \*

UNITED STATES PATENT AND TRADEMARK OFFICE
CERTIFICATE OF CORRECTION

PATENT NO. : 11,905,177 B2
APPLICATION NO. : 17/054149
DATED : February 20, 2024
INVENTOR(S) : Paven et al.

It is certified that error appears in the above-identified patent and that said Letters Patent is hereby corrected as shown below:

On the Title Page
Item (73) Assignee, Please change "COVESTRO INTELLECTUAL PROPERTY GMBH &CO. KG" to --FREIE UNIVERSITAT BERLIN--.

Signed and Sealed this
Twenty-third Day of April, 2024

Katherine Kelly Vidal
*Director of the United States Patent and Trademark Office*